United States Patent [19]

Kingstone

[11] Patent Number: 5,376,201
[45] Date of Patent: Dec. 27, 1994

[54] METHOD OF MANUFACTURING AN IMAGE MAGNIFICATION DEVICE

[76] Inventor: Brett M. Kingstone, 4380 L. B. McLeod Rd., Orlando, Fla. 32811

[21] Appl. No.: 86,435

[22] Filed: Jun. 30, 1993

Related U.S. Application Data

[63] Continuation-in-part of Ser. No. 861,511, Apr. 2, 1992, abandoned.

[51] Int. Cl.⁵ .................................................. B65H 81/00
[52] U.S. Cl. ..................................... 156/174; 156/250; 156/296; 156/426; 385/116; 385/120
[58] Field of Search ............... 156/174, 296, 250, 426; 385/116, 120, 121, 115; 65/4.3

[56] References Cited

U.S. PATENT DOCUMENTS

| | | | |
|---|---|---|---|
| 3,514,351 | 5/1970 | Mukai | 156/174 |
| 3,544,406 | 12/1970 | McAllister | 156/174 |
| 3,586,563 | 6/1971 | Fukami et al. | 156/174 |
| 3,607,560 | 9/1971 | Peck | 385/116 X |
| 3,644,922 | 2/1972 | James et al. | 385/116 X |
| 3,741,839 | 6/1973 | Komiya | 156/174 |
| 3,761,234 | 9/1973 | Siegmund | 385/121 X |
| 3,772,119 | 11/1973 | Peck | 156/174 X |
| 3,853,658 | 12/1974 | Ney | 385/116 X |
| 3,954,546 | 5/1976 | Aurenz | 156/174 X |
| 4,950,357 | 8/1990 | Sedlmayr | 156/174 X |
| 5,160,565 | 11/1992 | Chazalon et al. | 385/120 X |
| 5,204,927 | 4/1993 | Chin et al. | 385/121 |

FOREIGN PATENT DOCUMENTS

| | | | |
|---|---|---|---|
| 57-188003 | 11/1982 | Japan | 385/116 |
| 63-92905 | 4/1988 | Japan | 385/120 |

*Primary Examiner*—Jeff H. Aftergut
*Attorney, Agent, or Firm*—Warren L. Franz; James H. Beusse

[57] ABSTRACT

A process for manufacturing a fiber optic display screen is disclosed where a fiber is guided onto a revolving drum and disposed into input and output clamps located on the surface of the drum. The fiber guiding device allows the fiber to be precisely located on the surface of the drum in a hexagonal offset pattern in corresponding locals in the input and output clamps. The strand is continuously guided over several layers of long thin rectangular slotted spacers until the desired height of the display is created. The fibers between the output spacers are then cut to form two or more rectangular or square shaped fiber optic display screen apparatus. Large display screens can be constructed by placing several sections of these display apparatus together.

10 Claims, 4 Drawing Sheets

METHOD OF MANUFACTURING AN IMAGE MAGNIFICATION DEVICE

This is a continuation-in-part of application Ser. No. 07/861,511, filed Apr. 2, 1992, now abandoned, entitled "Automated Manufacturing Method for the Production of Fiber Optic Display Screens and Display Apparatus Configuration."

This invention relates to an improved fiber optics image magnification device and to a method for the automated manufacture of the same.

BACKGROUND OF THE INVENTION

Image magnification devices of the type to which the present invention relates employ elongated optical carrier strands, such as optical fibers, for expanding the separation between adjacent portions or "pixels" of an input image, while preserving the relative positional relationships between them. Input ends of the strands are gathered together in close proximity at an input surface and illuminated by respective portions of the input object or image. The light information is then conveyed for display to output ends of the same strands similarly grouped together at an output surface, but with much greater separations. Such devices find use, for example, as large television and advertising image display screens. See, e.g., U.S. Pat. Nos. 4,090,104 and 5,184,253. Conventional devices are, however, subject to illumination intensity and image definition problems due to loss of portions of the input image falling between the input ends of adjacent fibers, and are also subject to undesirable distortions due to inaccuracies in one-to-one correspondence between input and output surfaces.

Prior attempts at fiber optic screen manufacturing methods have been labor intensive and imprecise. Most such methods involve the use of pre-drilled or slotted black plexiglass panels to space thousands of fiber optic element output ends in a linear dot matrix pattern output surface in correspondence with a tighter matrix pattern formed by the input ends. Examples of such systems are found in U.S. Pat. Nos. 3,404,000, 3,853,658 and 4,090,104. The few inventors known to be experimenting with automating this task require the simultaneous use of multiple fiber optic strands and a resulting screen configuration consisting of multiple angularly cut wedge-shaped modules using geometrically square packing of the fibers both in the input bundle and output screen faces. Such wedge-shaped modules are cumbersome to stack on top of each other and the linear packing of fibers is space inefficient and non-uniform, resulting in a high degree of light loss and incoherence in the image being presented on the output screen. The multiple angularly cut modules also cause line and patchwork patterns which further distort the images being displayed on the screen.

The use of fiber optics for image guides has been known for decades. Coherent fiber optic image guides have been manufactured using various tools commonly employed in the endoscope and baroscope industry. These manufacturing techniques include various forms of winding devices in conjunction with clamping, spooling and epoxying systems. Examples of the same are found in U.S. Pat. Nos. 3,033,731; 3,104,191; 3,373,006; 3,383,192; 3,588,221; 3,592,398; 3,871,591 and 3,989,578.

Hicks, Jr. discloses an apparatus for fiber optic image magnification in U.S. Pat. No. 3,043,910. Several companies and inventors have experimented with fabricating the Hicks display device with only limited success. Due to the costs and inaccuracies in manufacture of these devices, the market for such display screens has been limited to just a few locations, such as amusement parks and public areas like Disneyland and airport locations. These screens have operated with very marginal success.

In U.S. Pat. Nos. 4,116,739 and 4,208,096, Glenn discloses an automated method of manufacturing multiple display screens of the Hicks design by wrapping a plurality of optical fibers about successive layers of spacer elements, which are later angularly severed to create several wedge-shaped devices. Similarly constructed wedge-shaped devices are disclosed by Sedlmayr in U.S. Pat. No. 4,650,280, wherein the spacer design is altered by providing a channel-shaped lip or flange to guide a ribbon, consisting of a plurality of side-by-side adjacently lying optical fibers, onto the spacer. In U.S. Pat. Nos. 4,773,730 and 4,786,139, Sedlmayr discloses a rather complicated and cumbersome assembly arrangement of piecing together multiple wedge-shaped modular fiber display screen devices with the use of many fastening items to form a single large screen. In U.S. Pat. No. 4,867,530, Sedlmayr further discloses a slotted alteration to his previously disclosed spacer design and shows its use in assembling a screen configuration utilizing a series of modular wedge-shaped devices. The concept of using a modular block design to construct large screens by combining multiple smaller display screens and input bundles is generally known. A manually constructed fiber optic display screen of approximately 10 ft. high × 50 ft. long consisting of dozens of modular blocks has been on display at the Disneyland Hotel in Anaheim, Calif. for more than 10 years.

The use of continuously wrapped multiple ribbons of fibers in creating these devices is subject to problems with the fibers crossing over each other during manufacture and to problems with the alignment and separation of the fibers in the output display face in order to achieve the desired magnification over the input. Past alignment attempts are shown in James U.S. Pat. No. 3,644,922, which uses notched spacers to hold the order of the fibers during placement. Sedlmayr uses channel-shaped or slotted flanges or lips molded into the spacers to receive the entire ribbon of fibers laying side by side. These methods are crude for they are either manually accomplished or incapable of precisely ordering and controlling the magnification level in the output. These methods also result in inaccuracy problems created by the linear ordering of fibers, with their center points one on top of the other in the input bundles. The fibers linearly aligned in a later row have a tendency to roll over and lay between the center points of the fibers of an earlier row. This often creates a significant disparity between alignment of the adjacent ends of the fibers in the input bundle and those of the same fibers in the output screen face, with a resulting deviation or skewing of the image on the display screen.

SUMMARY OF THE INVENTION

It is an object of the present invention to provide an improved fiber optic image magnification device that overcomes the image loss, image distortion and fiber alignment problems of conventional devices of the same type.

It is a further object of the invention to provide a method for the automated manufacture of such a device that avoids the crossover problems of multiple fiber feeding and rollover problems of tight rectangular array packing associated with conventional automated manufacturing techniques.

In accordance with one aspect of the invention, discussed in greater detail below, an improved fiber optic image magnification device comprises a plurality of elongated optical carrier strands having first, image input ends bundled together in a hexagonal close-packed array to form an image input surface and second, image output ends fixed in a hexagonal, relatively open-spaced array to form an image output surface or display screen. The input ends are arranged so that the fibers of a higher row are located in the interstices formed between adjacent fibers of a lower row, thereby maximizing the input surface field of view and avoiding misalignments due to rolling. The output ends are captured in alternating, laterally displaced row-defining slots of spacers which are bonded in superposed relationships to provide one-to-one hexagonal open-spaced positional correspondence between the output and input ends.

In another aspect of the invention, a method for the automated manufacture of a fiber optic image magnification device utilizes a single fiber optic element fed between close-packed positions within boundaries defined by an input clamp and corresponding open-spaced positions established by slots in spacers stacked one above another in an output clamp. Each spacer defines one output surface row, and each slot defines a column position within that row. The slots are staggered from one spacer to the next to match changing positional relationships created by staggered positioning ribs alternating from row to row within the input clamp.

The method of the invention allows for continuous production of a display screen using long rectangular spacers which are not angularly cut or severed in any way during the manufacturing operation, thus resulting in a rectangular or square-shaped output surface providing for an easily stacked seamless display screen. In the preferred embodiment, two groupings of output spacers are used in correlation with one input clamp. The spacer groupings are placed in nearby parallel locations so that the separate runs of fibers can be easily cut in the space between the spacers to create two display devices in a single operation. Unlike in prior art methods, there is no need to sever the spacers themselves, thereby greatly reducing costs normally associated with sawing time and eliminating sawing inaccuracies, especially in the production of large display screens.

In the preferred embodiment, discussed below, a revolving drum is utilized in conjunction with a mechanically or electronically controlled lead screw or similar guiding device which axially positions a single fiber element into a precise location into both the input clamp and output spacers located on the surface of the drum. The fiber is continuously fed into a hexagonal close-packed pattern at the input and a corresponding hexagonal open-spaced pattern at the output, which allows for better and fuller correspondence between input and output surfaces. Fiber guides affixed to the cylindrical surface of the drum aid in the alignment of the fiber during rotation. This method allows for maximum efficiency of the fiber strands in the input bundle and thus provides for maximum reception and transmission of light through the display system. The method overcomes the numerous problems associated with prior methods which simultaneously feed multiple fiber strands or "ribbons" typically ordered in a linear fashion over the centers of fibers in the previously positioned ribbon. The efficiencies obtained in both packing and placement allow for a brighter and clearer image to be displayed on the output screen. The structural design of the apparatus and utilization of the spacers incorporating unslotted end extension structures allows for more simplified final assembly and a completed end product that has lighter weight and greater structural integrity.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

Figure 1:
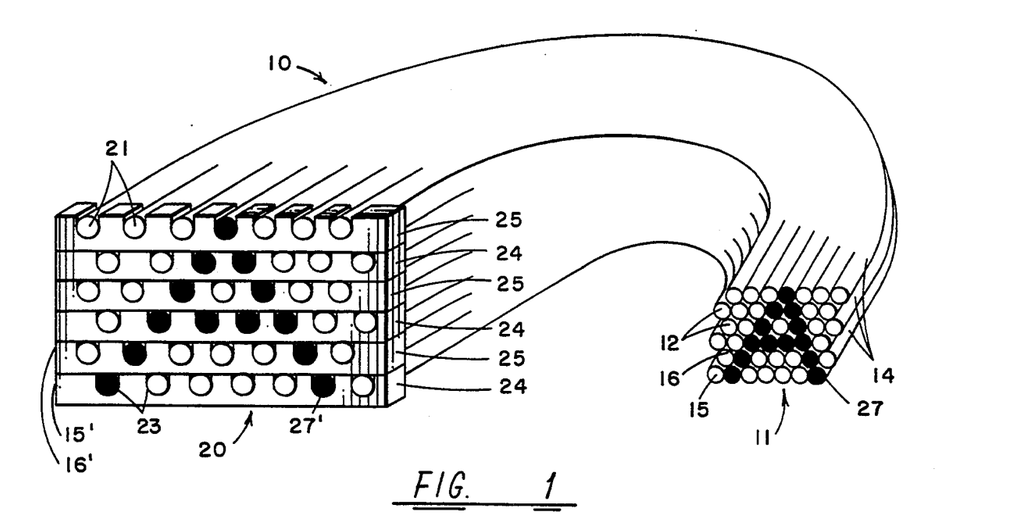
FIG. 1 is an embodiment of an image magnification device in accordance with the invention.
Figure 2A:
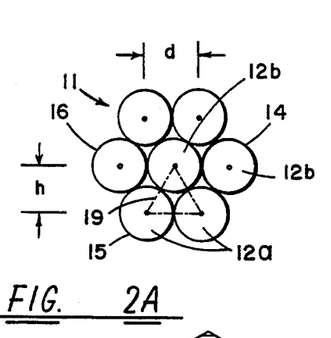
FIGS. 2A and 2B are enlarged fragmentary views of the input and output surfaces, respectively, of the device of FIG. 1.

As shown in FIG. 1, an image magnification device 10 in accordance with the invention comprises a light input surface 11 defined by one end 12 of each of a multiplicity of elongated optical carrier strands 14, such as fiber optic strands. As shown in FIG. 2A, the ends 12 are arranged in a hexagonal close-packed array, so that the ends 12a of a first horizontal row 15 of fibers 14 are in respective side-by-side adjacent contacting positions, and the ends 12b of a next horizontal row 16 of fibers 14 are in like respective side-by-side adjacent contacting positions, but with their positions laterally shifted so that they lie within interstices 17 formed between pairs of the underlying ends 12a. A relationship between each fiber end 12b and the underlying fibers 12a is thus established, so that an equilateral triangle 19 of side dimension d is defined by joining the centers of the end 12b and the two underlying ends 12a, 12b. Accordingly, the centers of adjacent ends 12 of each row 15, 16 are separated-by the same distance d which is generally equal to the diameter of the strands 14. The centers of ends 12 of successive rows 15, 16 are, thus, separated by a distance $h=d\sqrt{3}/2$. For the illustrated embodiment, the light input surface 11 is substantially planar so that it can be placed, in a preferred implementation, directly against the flat surface of an LCD display of an LCD image projection system, such as commercially available from Sharp. The surface 11 can, however, be varied as needed to conform to the shape of a display tube of a CRT projection system or other non-planar device from which an image is to be transferred.

Figure 2B:
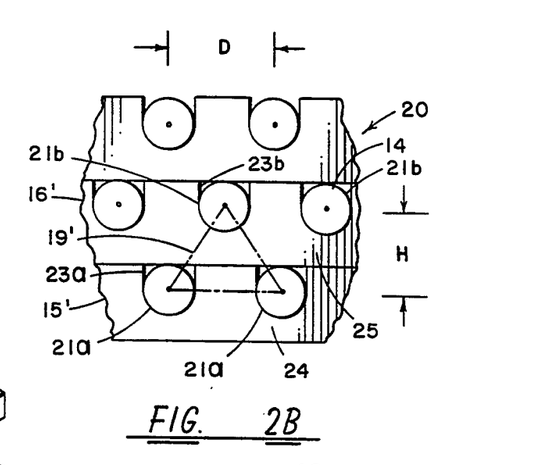

FIG. 1 also shows a light output surface 20 defined by the other ends 21 of the fiber optic strands 14. As shown in FIG. 2B, the ends 21 are likewise arranged in a hexagonal array. The array of surface 20, however, is relatively open-spaced, with ends 21 of the same horizontal row having centers spaced by a distance D, and with centers of fiber ends 21b of a higher row 16' being located by a vertical distance H over the spacing between the centers of the underlying fiber ends 21a. The relationship between each end 21b of row 16' and the two underlying ends 21a of row 15' is that of an equilateral triangle 19' which is geometrically similar to the triangle 19 of the surface 11. The open spacing is such that each side of triangle 19' of length D is greater by a magnification factor n than the corresponding length d of triangle 19. Thus, the horizontal spacing between centers of adjacent ends 21 of each row 15', 16' is a length of $D=n \times d$; and the vertical spacing H between the centers of ends 21 of adjacent rows 15', 16' is a distance $H=n \times h=n \times d\sqrt{3}/2$. The ends 21 of the output surface 20 are in one-to-one positional correspondence with the ends 12 of the input surface 11, so that the ends 21 occupy column and row positions in surface 20, which bear the same (or, if preferred, mirror image) relationships to each other as corresponding column and row positions occupied in surface 11 by the other ends 12 of the same fibers 14. Thus, the fiber strands whose ends 21a, 21b define the vertices of triangle 19' at the output surface 20 are the same fiber strands whose ends 12a, 12b define the vertices of the corresponding triangle 19 in input surface 11.

The positional relationships of the fiber ends 12 within the close-packed array 11 are maintained by bonding the cylindrical surfaces of fiber ends 12 together by means of an adhesive or other known means which does not interfere with their light receiving abilities. The positional relationships of the fiber ends 21 are maintained by bonding the cylindrical surfaces of fiber ends 21 within respective laterally spaced identical slots 23 of laterally extending horizontal spacers 24, 25. Each spacer 24, 25 corresponds to a different row 15', 16'. Slots 23a of a lower spacer 24 (see FIG. 2B) correspond to column positions of a lower row 15' and are laterally offset by a horizontal distance D/2 with respect to slots 23b of a higher spacer 25 which correspond to column positions of a higher row 16'. Slots 23 extend longitudinally for a distance sufficient to snugly receive the ends 21 of respective fibers 14 therein. The spacers 24, 25 have heights of dimension H for defining the vertical spacing between rows 15', 16'. The slots 23 preferably extend to a depth of diameter d of the fibers 14.

For the seven fiber rows 15, 16 of the input surface 11 shown in FIG. 1, each output surface spacer 24, 25 has a corresponding seven slots 23. Securing the ends 21 in respective positions within slots 23 of a spacer 24, 25 establishes column positioning in each row 15', 16' in the output surface 20 in one-to-one correspondence with column positioning in a corresponding input row 15, 16 in surface 11. By alternating spacers 24, 25 one on top of another in a vertically stacked structure as shown, a row position is established for each end 21 corresponding to a row position of each end 12 for the same fiber 14. The output surface 20 of the illustrated structure 10 is substantially planar but, as with input surface 11, could also be made non-planar. Fibers 14 extend axially longitudinally between the input and output surfaces 11, 20, for distances of length sufficient to accomplish the desired image transmission between the surfaces 11, 20.

In operation, an image, such as the letter "A" indicated by reference numeral 27 in FIG. 1, is projected from an LCD screen or other illuminating mechanism onto the fiber ends 12 at input surface 11 and is conveyed to corresponding ends 21 of the same fiber strands 14 at output surface 20. The effect of expanding the close-packed array 11 defined by triangle 19 of side d into the spaced array 20 defined by triangle 19' of side $D=n \times d$, is to effectively expand image 27 into an n-times magnified image, such as into the larger letter "A" indicated by reference numeral 27' at output surface 20. By utilizing a hexagonal close-packed structure at the input surface 11, rather than a rectangular array as done conventionally, rollover problems and loss of portions of image 27 due to gaps between fiber ends at the input surface are minimized. By maintaining the same hexagonal relationship onto the output surface 20, the aspect ratio of the enlarged output image is the same as that of the original input image, and distortion is minimized.

Illustrative methods of manufacturing the device 10 are described with reference to FIGS. 3-12. In a preferred implementation, device 10 is constructed by continuously drawing a single fiber about a drum.

Figure 3:
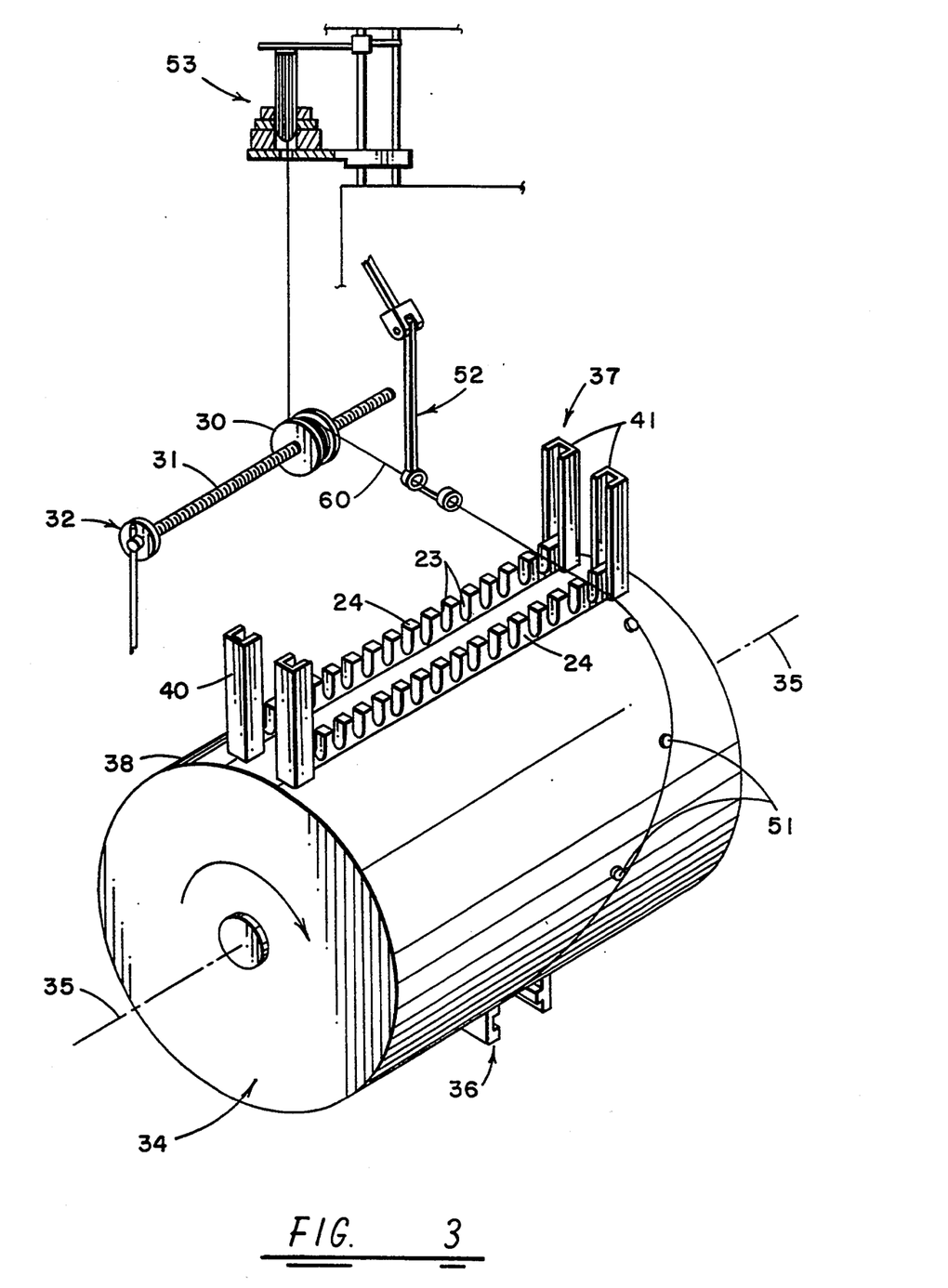
FIG. 3 is a view of an exemplary apparatus for the automated manufacture of the device of FIG. 1.
Figure 4:
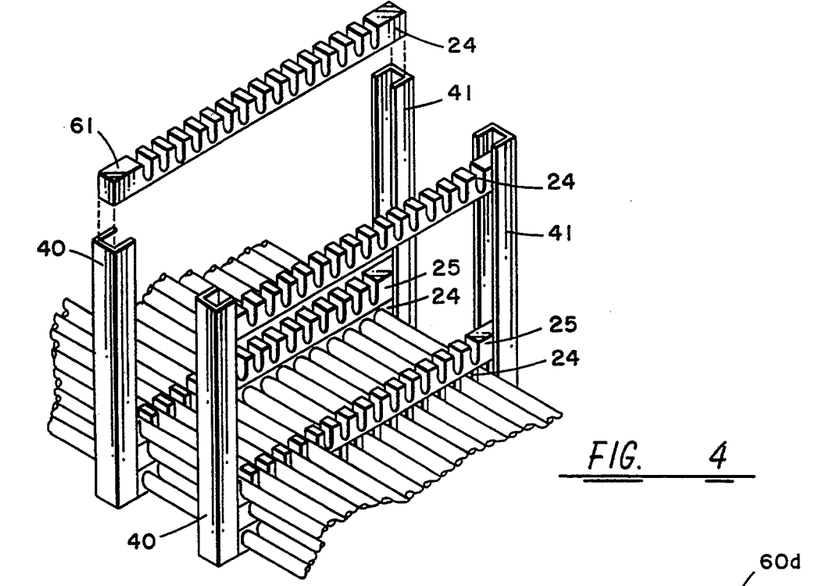
FIG. 4 is a perspective view illustrating the operation of the output spacers in the apparatus of FIG. 3.

As shown in FIG. 3, a single fiber spool 30 is positioned on a threaded shaft 31 of an electronically or numerically controlled lead screw device 32 for controlled displacement axially of a drum 34 which is rotated about a laterally extending axis 35. An input clamp assembly 36 and a tandem arrangement of output clamp assemblies 37 extend laterally in diagonally opposite locations on the drum cylindrical surface 38. Each output clamp 37 comprises an opposing pair of laterally spaced, vertically extending U-shaped guide channels 40, 41, between which a series of laterally extending spacers 24, 25 (see FIGS. 3 and 4) can be captured by sliding insertion from above. Assemblies 37 are longitudinally spaced, circumferentially of the drum surface 38, by a short distance.

Figure 5:
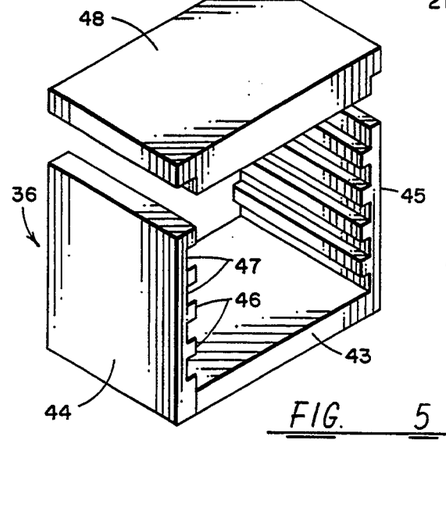
FIG. 5 is a view of the input clamp element of FIG. 3.
Figure 6:
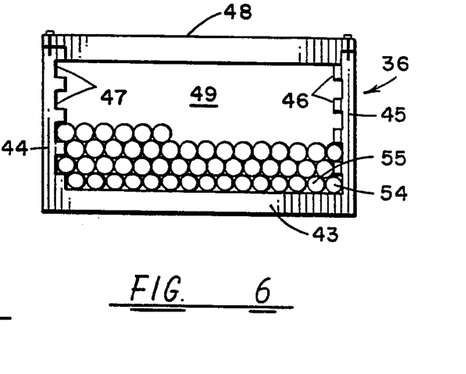
FIG. 6 is a front view showing use of the clamp of FIG. 5.
Figure 7:
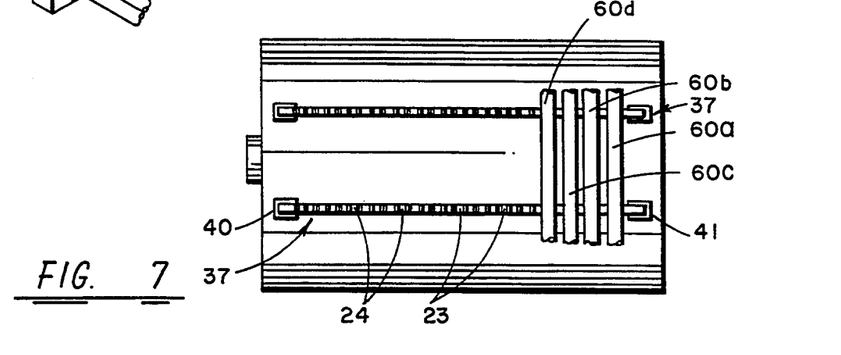
FIGS. 7 and 8 are top views of different positionings for the output spacers in the apparatus of FIG. 3.

Input clamp assembly 36, shown in greater detail in FIGS. 5 and 6, comprises a U-shaped member 43 having laterally spaced, longitudinally extending walls 44, 45, with facing inside surfaces characterized by vertically spaced, longitudinally extending alternating ribs 46 and hollows 47. The respective placements of the ribs 46 and hollows 47 are such that a rib 46 on wall 44 is opposite a hollow 47 on wall 45, and a hollow 47 on wall 44 is opposite a rib 46 on wall 45. Assembly 37 also includes a removable top 48 for covering the top opening of assembly 37, but leaving an open-ended channel 49 passing longitudinally therethrough.

The spacers 24, 25 of each output clamp assembly 37 include pluralities of open-topped, longitudinally extending U-shaped slots 23. As discussed previously, slots 23 have depths d corresponding to the diameter of the optical fiber, and have center-to-center lateral spacings of distance D. Each spacer 24, 25 corresponds to a row position of a row of fiber ends 21a at the device output surface 20 (see FIGS. 1 and 2B), and the positions of slots 37 of each spacer 24, 25 correspond to the column positions of the ends 21 for that row. The output clamp guide channels 40, 41 act to hold the output spacers 24, 25 in place during the manufacturing operation. The spacers 24, 25 illustrated in FIGS. 3 and 4 each have 15 slots 23 for development of an output screen 20 having 15 laterally spaced fiber ends 21 per row. The positions of slots 37 in each spacer 25 are laterally shifted by a distance D/2 relative to the positions of slots 37 for each spacer 24.

Input clamp 36 is correspondingly configured to give a close-packed structure to input ends 12 of the same lengths of fiber. The tiers defined by the opposing pairs of ribs 46 and hollows 47 of facing surfaces of walls 44, 45 define the close-packed rows 15, 16 of input surface 11. The lateral spacing between walls 44, 45 at each level is equal to the combined diameters of the number of column positions of the ends 21 in that row. Thus, for the illustrated 15 fiber ends-per-row construction contemplated by the manufacturing apparatus of FIGS. 3–6, the distance between the rib 46 and hollow 47 for each row is $15 \times d$. The height of each rib 46 and hollow 47 is equal to $h = d\sqrt{3}/2$ to define the vertical center-to-center spacing between rows. The lateral projection of a rib 46 of one row out from the hollow 47 of an adjacent row is made equal to a distance d/2 to define the lateral shift in column positioning from row to row. This places the centers of ends 12b of a row 16 centrally in the interstices between the centers of ends 12a of an underlying row 15 (see discussion above with reference to FIGS. 1 and 2A). The undersurface of cover 48 serves to hold the top row of strands 14 in place, at least until the assembled close-packed structure has been bonded.

To assist in placing the fiber, a plurality of fiber guides 51 can be optionally located, such as by welding or riveting, onto the drum 34 in locations for the fibers to occupy in wrapping from a particular row-column position within the input matrix of clamp 36 to a corresponding row-column position-defining slot 37 of a spacer 24, 25. A robotic arm 54 (FIG. 3) or similar guiding device may be used separately or in addition to the existing lead screw device 32 to direct or assist proper axial positioning of the fiber into a respective slot 23, as the fiber is fed about drum 34. Spool 34 may also be replaced or augmented by a fiber optic draw tower 53 above the lead screw device 32, and the process further automated by drawing the glass or plastic fiber just prior to guiding it down through lead screw device 32 and into its placement on the drum 34.

With the apparatus as thus described, a single fiber 60 can easily be guided into a hexagonal close-packing using the input clamp assembly 36 and into a corresponding hexagonal open-spaced array using spacers 24, 25 built up in alternating succession, one on top of another, within the output clamp assemblies 37. The lead of the single filament 60 may be secured to drum 34 by suitable means so that it passes in a first drum rotation through both a row 1, column 1 position 54 (FIG. 6) at a bottom corner of the input clamp channel 49 (FIGS. 3 and 6) and into corresponding row 1, column 1 slots of bottom rows of spacers 24 inserted within the guide channels 40, 41 of each output clamp assembly 37.

Unless the feed is started between the assemblies 37, the assemblies 37 and/or spacers 24, 25 should be configured and/or placed to compensate for a lateral translation which will otherwise occur between the input and output end positionings of one of the devices. Guides 51 (only one set of which is shown) assist the positioning of fibers 60 between the input 36 and output clamp assemblies 37. The feeding procedure then continues uninterrupted with the fiber 60 next fed into the row 1, column 2 positions 55 (FIG. 6) along the bottom of input clamp 36, and the slots 23 of first row spacers 24 which define the corresponding row 1, column 2 positions in the output clamp assemblies 37. This process continues for successive strand run lengths 60a, 60b, 60c, 60d of fiber (see FIG. 7), until all column positions of the bottommost rows in both input and output clamp assemblies 36, 37 are filled. The feeding process is then repeated, for all column positions of the second rows.

Fiber 60 may be guided to begin filling the second row starting with the row 2, column 1 position and ending with the row 2, column 15 position, or starting with the row 2, column 15 position and ending with the row 2, column 1 position, according to preference. In either event, the spool 30 and/or arm 52 are shifted axially back and forth while drum 34 is rotating, until a sufficient number of successive rows in both input and output clamp assemblies 36, 37 are completed to produce the desired height of the display output screen 20. When all slots 23 of a lower spacer 24 are filled, a higher spacer 25 is added until its slots 23 are filled, and so forth, with spacers 24, 25 alternating one above the other. Row-to-row columnar displacement for hexagonal packing in the input surface 11 is achieved at the input clamp 36 by alternating ribs 46 with hollows 47 from row to row. Hexagonal packing in the output surface 20 is achieved by corresponding lateral displacement of slots 23 between spacers 24, 25 of successive rows.

Figure 8:
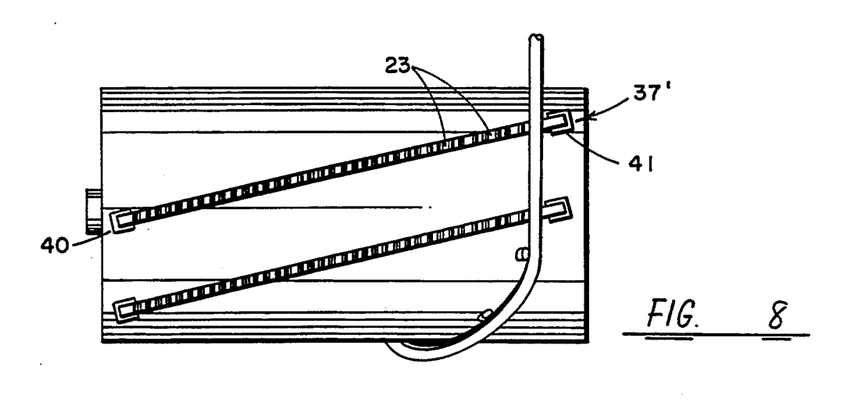
Figure 9:
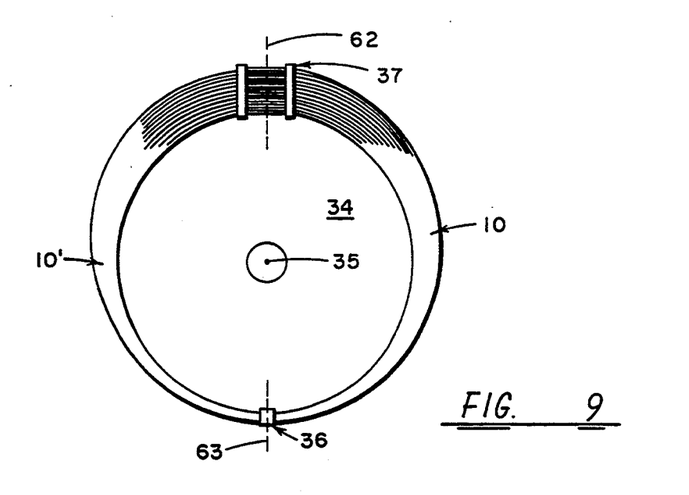
FIG. 9 is a side view of the drum of FIG. 3 after completion of the simultaneous manufacture of two devices as in FIG. 1, prior to removal and separation of the two devices.
Figure 10:
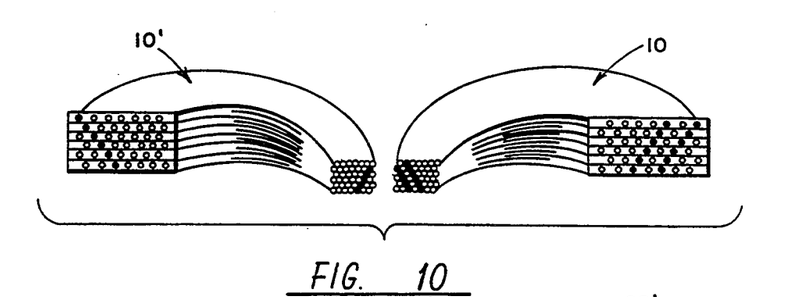
FIG. 10 is a schematic view of the devices of FIG. 9, after severance.
Figure 11:
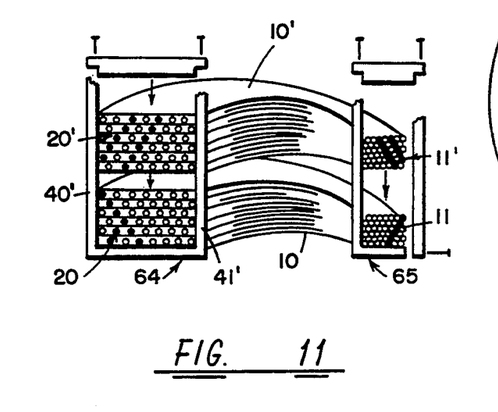
FIG. 11 is a schematic view showing the devices of FIG. 10 being mounted into a composite large screen structure.
Figure 12:
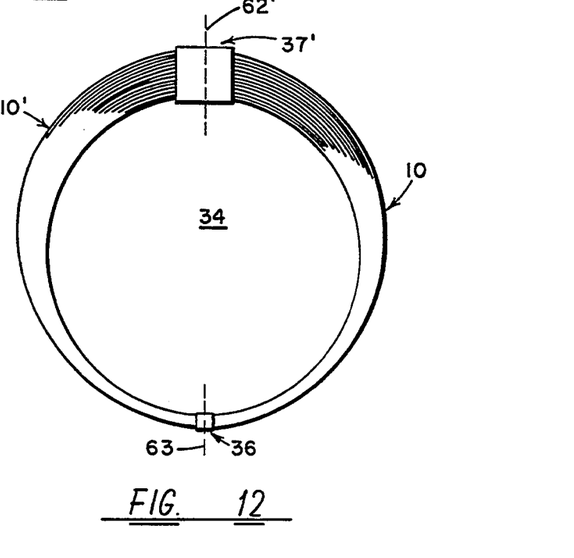
FIG. 12 is a view, similar to that of FIG. 9, showing use of a single output spacer grouping, which is later severed along its center line.

The facing openings of horizontal U-shaped cross-sections of guide channels 40, 41 serve to hold the long flat spacers 24, 25 in place during the manufacturing operation. Unslotted ends 61 (FIG. 4) on each spacer match the cross-section of channels 40, 41 to enable the spacers to be easily slid down into the channels. The lengths of the spacers and numbers of slots 23 may be varied to meet the requirements of the desired output screen 20. FIG. 8, for example, shows an alternative arrangement for producing a screen 20 having 19 columnar or pixel positions per row. Corresponding modifications can be made at the input clamp 36 to correspondingly affect the configuration of the input surface 11 to meet particular needs.

Two-stage epoxy, such as Devcon or 3M epoxy, or other bonding agent, can be used to hold the fiber ends and spacers together in the input, as well as the output bundles. The two output clamp assemblies 37 are set apart so that when the operation is complete, the pluralities of fiber lengths 14 can be readily cut with a blade, electronically heated nichrome wire or the like inserted between the respective sets of spacers 24, 25, to enable separation of the two device screen faces 20 without requiring the use of a collapsing device or release mechanism on drum 34. This also eliminates the need for costly and time-consuming sawing operations used to sever the spacers, where only one group of spacers is used to create multiple displays 20.

For the illustrated method, when the column positions of all rows have been filled, cover 48 is added to assure alignment of the top row of the close-packed hexagonal array within the input clamp 36, at least during bonding. After severance of the fiber lengths 14 along a line 62, indicated in FIG. 9, cover 48 can be removed and walls 44, 45 of the input clamp separated to release the joined hexagonally close-packed surfaces 11 of the two devices 10, 10'. These can then be severed along a line 63 using a bandsaw or other appropriate means, to produce the two devices 10, 10', indicated schematically in FIG. 10. Alternatively, the entire clamp 36 can be removed from the drum 34, left in place and cut in half.

A variation of the same manufacturing process can be utilized to simultaneously manufacture a greater number of devices, simply by adding more pairs of output clamp assemblies 37 and correspondingly more input clamp assemblies 36 about the circumference of drum 34. For the given arrangement, two output clamp assemblies 37 and one input clamp 36 are used for each pair of devices 10, 10'. The lengths of the strands 14 between input surfaces 11 and output surfaces 20 are determined by the circumferential spacings of the clamps. Larger lengths use larger circumferential spacings; shorter lengths use shorter circumferential spacings. The excess fiber threads extending from the bonded spacers 24, 25 after cutting along line 62 (FIG. 9) can be removed manually by cutting them with scissors, electrically heated nichrome wire, or other suitable means. The screen faces 20 can then be polished to a smooth finish using known sanding, grinding and polishing techniques.

The lines and patchwork patterns normally associated with large conventional fiber optic display screens can be eliminated by using spacers 24, 25 that extend for the entire length of one side of the desired display. Thus, if a 5×7' display is desired, for example, output spacers 24, 25 that are 5' or 7' long can be used, which are laid across the surface of the drum 34 of equal or greater width. As already mentioned, the diameter of drum 34 to be utilized will be determined by the required tail length of the fiber strands 14 between the input and output faces 11, 20 for the desired size display being constructed. Typically, the larger the display, the longer the desired tail length will be. This is especially so in the case of very large display screens. It may sometimes be easier to build a screen in successive one or two foot high sections that can later be stacked together both at the input and output faces. Unlike previous methods, the disclosed spacer design allows for a construction which will result in a smooth and seamless screen face 11. In such case, the extensions 61 at the ends of the spacers 24, 25 (see FIG. 4) can be used as locator guides for mating an output surface 20 of one device 10 with another output surface 20' of another device 10' using an output screen framing clamp 64 having taller opposing guide channels 40', 41'. This is shown schematically in FIG. 11. The bonded fibers at the input ends 11, 11' of the same devices can likewise be conveniently and seamlessly nested, one onto another, in an input end frame 65 having the same general, but taller, construction as input clamp assembly 36. Achievement of a seamless joinder of multiple devices 10, 10' in this way further acts to eliminate lines and distortions in the projected image.

Another important objective for an efficiently packed input port is a maximization of the amount of light being transmitted through the fiber optic system by minimizing the light lost due to glue seams and interstitial spaces between input fiber ends 12. The hexagonal close-packed structure obtained with the described process achieves this by providing less light loss than devices constructed using conventional manufacturing procedures.

Spacers 24, 25 can also be placed at an angle across drum 34 for increased magnification with less space between ends 21, as shown in FIG. 8. The angle of the spacers can be varied to suit individual needs for positioning of the fibers as they leave the output faces for both final assembly considerations and viewing angle and brightness capabilities of the resulting display screens. As already mentioned, slots 23 on the spacers 24, 25 can be varied in spacing and location based on the desired magnification on the display screen and placement of spacers 24, 25 on drum 34.

In some cases, particularly in the manufacture of smaller display screens 10, 10', it may prove to more practical to use a single set of spacers 24, 25 and one clamp assembly 37 to create two devices 10, 10', rather than utilizing two assemblies 37 as described above. This is shown by the single assembly 37' in FIG. 12. In such case, the devices 10, 10' are separated by cutting through the spacers themselves along a line 62'. And, though the single fiber feeding method is especially advantageous, many of the benefits and advantages of the invention are realizable by simultaneously feeding more than one fiber, fed either off the same lead screw or guiding device or fed through separate individual lead screws or guiding devices.

Those skilled in the art to which the invention relates will appreciate that other substitutions and modifications can also be made to the described embodiments without departing from the spirit and scope of the invention as described by the claims below.

What is claimed is:

1. A method of manufacturing an image magnification device, comprising the steps of:
    rotating a drum about a lateral axis; the drum having circumferentially spaced input and output clamps;
    mounting a first spacer within the output clamp, the spacer having a plurality of laterally spaced slots;
    drawing an elongated optical carrier strand from a strand source onto the drum and over the input and output clamps;
    shifting the strand axially as it is being drawn, to guide it with successive drum rotations into successive adjacent column positions of a first row within the input clamp, and into successive adjacent slots of the first spacer within the output clamp;
    mounting a second spacer over the first spacer within the output clamp, the second spacer having a plurality of laterally spaced slots, laterally offset by one-half the lateral spacing relative to the slots of the first spacer;
    continuing to draw the elongated carrier strand from the source onto the drum and over the input and output clamps;
    continuing to shift the strand axially as it is continued being drawn, to guide it with successive drum rotations into successive adjacent column positions of a second row within the input clamp and into successive adjacent slots of the second spacer within the output clamp; the column positions of the second row within the input clamp lying within interstices between pairs of the column positions of the first row within the input clamp; and repeating the foregoing steps, for successive additional alternating first and second rows in the input clamp and for successive additional alternating first and second spacers in the output clamp; the strand being formed into a hexagonal close-packed array at the input clamp and into a hexagonal open-spaced array at the output clamp, with a one-to-one correspondence existing between respective row and column positions at the input and output clamps.

2. The method of claim 1, further comprising the step of cutting the strand to provide a first multiplicity of strand lengths, with first ends making up the hexagonal close-packed array and with second ends making up the hexagonal open-spaced array.

3. The method of claim 2, wherein the output clamp is a first output clamp; the drum further has a second output clamp circumferentially spaced from the input clamp and from the first output clamp; the steps performed with respect to the first output clamp are similarly performed using alternating first and second spacers within the second output clamp; and the step of cutting comprises cutting the strand between the first and second output clamps to provide first and second multiplicities of strand lengths, the first having second ends making up a hexagonal open-spaced array formed at the first output clamp and the second having second ends making up a hexagonal open-spaced array formed at the second output clamp.

4. The method of claim 2, further comprising the steps of adhesively bonding the first ends together to define a light input surface, and of adhesively bonding the second ends and spacers together to define a light output surface.

5. The method of claim 1, wherein the offset columnar positioning for alternating first and second rows is achieved by alternating ribs with hollows at successive tiers on opposing walls of the input clamp.

6. The method of claim 1, wherein the spacers each have pluralities of open-topped, U-shaped slots; and wherein when all slots of a lower spacer are filled, a higher spacer is added until its slots are filled.

7. The method of claim 6, wherein the strand has a given diameter, the slots are separated by a spacing distance equal to a multiple of the given diameter, and the spacers have identical heights equal to $\sqrt{3}/2$ times the spacing distance.

8. The method of claim 1, wherein the output clamp includes laterally spaced guide channels having facing openings of horizontal U-shaped cross-section, and the spacer mounting steps comprise sliding ends of alternating first and second, long flat spacers down into the openings.

9. The method of claim 1, comprising the additional steps of repeating the steps of claim 12 to produce a plurality of image magnification devices; and forming a large screen through modular nesting of the plurality of image magnification devices using locator guides.

10. The method of claim 1, wherein the drawing step comprises drawing an optical fiber from a draw tower.

* * * * *